United States Patent
Sorea et al.

(10) Patent No.: US 12,186,810 B2
(45) Date of Patent: Jan. 7, 2025

(54) METHOD OF MANUFACTURING AN OBJECT BY JOINING TWO POWDER METALLURGICAL COMPONENTS

(71) Applicant: Grundfos Holding A/S, Bjerringbro (DK)

(72) Inventors: Alexandro Sorea, Aalborg Ø (DK); Peter Valler, Aalborg SØ (DK); Allan Ivo Søegaard, Hobro (DK); Henrik Rasmussen, Rødkærsbro (DK); Flemming Buus Bendixen, Hobro (DK)

(73) Assignee: Grundfos Holding A/S, Bjerringbro (DK)

( * ) Notice: Subject to any disclaimer, the term of this patent is extended or adjusted under 35 U.S.C. 154(b) by 339 days.

(21) Appl. No.: 17/781,636

(22) PCT Filed: Dec. 3, 2020

(86) PCT No.: PCT/EP2020/084463
§ 371 (c)(1),
(2) Date: Jun. 1, 2022

(87) PCT Pub. No.: WO2021/110835
PCT Pub. Date: Jun. 10, 2021

(65) Prior Publication Data
US 2022/0410263 A1    Dec. 29, 2022

(30) Foreign Application Priority Data
Dec. 4, 2019 (EP) .................................. 19213513

(51) Int. Cl.
*B22F 7/06* (2006.01)
*B22F 3/00* (2021.01)
*B22F 3/10* (2006.01)
*B22F 9/24* (2006.01)
*B22F 10/00* (2021.01)
(Continued)

(52) U.S. Cl.
CPC ............... *B22F 7/064* (2013.01); *B22F 3/00* (2013.01); *B22F 3/10* (2013.01); *B22F 10/00* (2021.01);
(Continued)

(58) Field of Classification Search
CPC ...... B22F 7/064; B22F 10/10; B22F 2999/00; B22F 7/062; B22F 3/00; B22F 10/00;
(Continued)

(56) References Cited

U.S. PATENT DOCUMENTS 5,487,865 A * 1/1996 Hampton ............... B22F 3/1115
419/30
6,551,551 B1 * 4/2003 Gegel ..................... B22F 3/225
419/5
(Continued)

FOREIGN PATENT DOCUMENTS

DE    102004057360 A1 *  6/2006  ............. B22F 3/008
DE    102004057360 B4 * 11/2007  ............. B22F 3/008
(Continued)

OTHER PUBLICATIONS

Extended European Search Report; European Patent Office; European Application No. 19213513.5; May 8, 2020; 11 pages.
(Continued)

*Primary Examiner* — Lawrence Averick
(74) *Attorney, Agent, or Firm* — Taft Stettinius & Hollister LLP

(57) ABSTRACT

A method of manufacturing an object by joining a first component and a second component. The first component comprises metal powder with a first alloy composition and a first soluble binder, and the second component comprises metal powder with a second alloy composition and a second soluble binder. They may further comprise ceramic powder. At least one of the surfaces to be joined is dissolved before
(Continued)

they are brought in contact, or a mixture of metal powder with a third alloy composition and a dissolved third binder is arranged there between. The chemical differences between the first, second, and third alloy compositions are within predetermined limits. The components are sintered or oxidized together whereby it is possible to obtain an object wherein the transitions between the material phases from the joined components are close to inconspicuous when analysed with scanning electron microscopy.

12 Claims, 6 Drawing Sheets

(51) Int. Cl.
  *B22F 10/10*  (2021.01)
  *B33Y 10/00*  (2015.01)
(52) U.S. Cl.
  CPC .............. *B22F 10/10* (2021.01); *B33Y 10/00* (2014.12); *B22F 9/24* (2013.01)
(58) Field of Classification Search
  CPC ... B22F 3/225; B22F 3/20; B22F 3/22; B33Y 10/00; B33Y 80/00; C22C 1/05
  See application file for complete search history.

(56) References Cited

U.S. PATENT DOCUMENTS

| | | | | |
|---|---|---|---|---|
| 7,250,123 | B2 * | 7/2007 | Fujioka | C04B 35/117 |
| | | | | 264/43 |
| 10,710,156 | B2 * | 7/2020 | Colin | B22F 1/052 |
| 10,953,468 | B2 * | 3/2021 | Thakare | B22F 7/08 |
| 11,313,243 | B2 * | 4/2022 | Shi | F01D 11/122 |
| 11,707,781 | B2 * | 7/2023 | Seleznev | B22F 10/64 |
| | | | | 428/548 |
| 11,976,569 | B2 * | 5/2024 | Shuck | B22F 7/08 |
| 2005/0147851 | A1 * | 7/2005 | Fujioka | C04B 35/5626 |
| | | | | 428/698 |
| 2007/0107216 | A1 * | 5/2007 | DaSilva | B23P 6/005 |
| | | | | 29/889.1 |
| 2011/0057894 | A1 * | 3/2011 | Yukawa | G06F 3/0423 |
| | | | | 345/173 |
| 2016/0175929 | A1 * | 6/2016 | Colin | B22F 1/052 |
| | | | | 219/76.12 |
| 2018/0162047 | A1 * | 6/2018 | Gibson | B33Y 40/00 |
| 2020/0180033 | A1 * | 6/2020 | Thakare | B22F 7/062 |
| 2021/0053116 | A1 * | 2/2021 | Seleznev | B33Y 80/00 |
| 2021/0146603 | A1 * | 5/2021 | Raeker | C04B 35/00 |

FOREIGN PATENT DOCUMENTS

| | | | | | |
|---|---|---|---|---|---|
| DE | 102011082484 | A1 * | 3/2013 | ............. | B22F 3/225 |
| JP | 5487865 | B2 * | 5/2014 | ........... | G06F 3/0423 |
| JP | 6551551 | B2 * | 7/2019 | | |
| JP | 2019119653 | A * | 7/2019 | | |

OTHER PUBLICATIONS

International Search Report; European Patent Office; International Application No. PCT/EP2020/084463; Jan. 26, 2021; 4 pages.
Written Opinion of the International Searching Authority; European Patent Office; International Application No. PCT/EP2020/084463; Jan. 26, 2021; 11 pages.

* cited by examiner (a) (b)

(c) (d)

(e) (f)

(a)

(b)

(c)

(d)

(e)

(f)

METHOD OF MANUFACTURING AN OBJECT BY JOINING TWO POWDER METALLURGICAL COMPONENTS

CROSS-REFERENCE TO RELATED APPLICATIONS

This application is a U.S. National Phase of International PCT Application No. PCT/EP2020/084463 filed on Dec. 3, 2020, which claims priority to European Patent Application No. 19213513.5 filed on Dec. 4, 2019, each of which are incorporated herein by reference in their entirety.

FIELD OF THE INVENTION

The present invention relates to a method of manufacturing an object by joining two powder metallurgical components. In particular it relates to a method with which it is possible to obtain a unitary object without defects and with substantially constant properties across the former interface between the joined components.

BACKGROUND OF THE INVENTION

Within a number of technical fields including mechanical engineering, it is often necessary to manufacture an object from several components. This may e.g. be relevant for an object having a complex geometry that is easier or only possible to obtain by assembly of components which each are of a simple geometry that is easy to manufacture. Such a simple geometry may e.g. have a constant cross-section and a longitudinal extension that is suitable for manufacturing by extrusion. When such objects are made from metal or metal-based composites, they are typically joined by e.g. welding or soldering. However, even though a strong bonding can be obtained, it is also well-known that such joining regions may be critical e.g. due to defects or thermal stresses arising from the joining process. The bonding may therefore be a potentially weak region in the object, and this may be even more the case in relation to fatigue loading that can cause cracks to be initiated from a small defect and grow to a critical size during use of the object.

Hence, an improved method of joining two metal components into one coherent object would be advantageous.

OBJECT OF THE INVENTION

Thus, it is an object of the present invention to provide a method of joining two components with which a stronger bonding can be obtained than with known methods.

It is another object of the present invention to provide a method of joining two components with which a bonding can be obtained which has a higher resistance against failure due to fatigue loading than with known methods.

It is another object of the present invention to provide a method of joining two components with which it is possible to obtain an object having more uniform properties across an interface between the two joined components than what can be obtained with known methods.

It is a further object of the present invention to provide an alternative to the prior art.

In particular, it may be seen as an object of the present invention to provide a method of manufacturing an object by joining two components that solves the above mentioned problems of the prior art.

SUMMARY OF THE INVENTION

Thus, the above described object and several other objects are intended to be obtained by providing a method of manufacturing an object by joining a first component and a second component, the method comprising the following steps:
providing the first component comprising metal powder with a first alloy composition and a first soluble binder, the first component having a first joining surface,
providing the second component comprising metal powder with a second alloy composition and a second soluble binder, the second component having a second joining surface to be joined with the first joining surface;
wherein the first alloy composition and the second alloy composition both consist of a plurality of chemical elements, and wherein the chemical elements are chosen so that, for each of the chemical elements being present in an amount higher than 0.5 weight % in each of the alloy compositions, that chemical element is comprised both in the first and second alloy composition, and
for the chemical elements being present in the first alloy composition in amounts of up to 5.0 weight %, the amount of that chemical element differs by at most 1 percentage point between the first and second alloy compositions, and
for the chemical elements being present in the first alloy composition in amounts of more than 5.0 weight %, the amount of that chemical element differs by at most 3 percentage point between the first and second alloy compositions;
enabling the joining by:
at least partly dissolving the first joining surface and/or the second joining surface by applying a solvent, and
bringing the first joining surface in contact with the second joining surface and maintaining this contact for a time period allowing for at least some evaporation of the solvent; and
sintering or oxidizing the first and second components together while maintaining the first and second joining surfaces in contact in order to achieve the object.

In an alternative to the method just described, the above described object and several other objects are intended to be obtained by providing a method of manufacturing an object by joining a first component and a second component, the method comprising the following steps:
providing the first component comprising metal powder with a first alloy composition and a first soluble binder, the first component having a first joining surface,
providing the second component comprising metal powder with a second alloy composition and a second soluble binder, the second component having a second joining surface to be joined with the first joining surface;
wherein the first alloy composition and the second alloy composition both consist of a plurality of chemical elements, and wherein the chemical elements are chosen so that, for each of the chemical elements being present in an amount higher than 0.5 weight % in each of the alloy compositions, that chemical element is comprised both in the first and second alloy composition, and
for the chemical elements being present in the first alloy composition in amounts of up to 5.0 weight %, the amount of that chemical element differs by at most 1 percentage point between the first and second alloy compositions, and
for the chemical elements being present in the first alloy composition in amounts of more than 5.0 weight %, the amount of that chemical element differs by at most 3 percentage point between the first and second alloy compositions;

enabling the joining by:
arranging a mixture comprising dissolved third binder and metal powder with a third alloy composition between the first joining surface and the second surface, such as on at least one of the first and second joining surfaces, wherein the third alloy composition consists of a plurality of chemical elements which are chosen so that, for each of the chemical elements being present in an amount higher than 0.5 weight % of the metal powder in the mixture:
for the chemical elements being present in the third alloy composition in amounts of up to 5.0 weight %, the amount of that chemical element differs by at most 1 percentage point between the first and third alloy compositions, and
for the chemical elements being present in the third alloy composition in amounts of more than 5.0 weight %, the amount of that chemical element differs by at most 3 percentage point between the first and third alloy compositions, and
arranging the first and second joining surfaces as close together as possible while sandwiching the mixture of dissolved third binder and metal powder there between, and maintaining the first and second joining surfaces in contact with the mixture of dissolved third binder and metal powder for a time period allowing for at least some evaporation of the solvent; and
sintering or oxidizing the first and second components together while maintaining the first and second joining surfaces as close together as possible in order to achieve the object.

By "as close as possible" is meant while sandwiching the mixture there between and taking the shapes of the first and second joining surfaces into account. By "sandwiching" is meant that the first and second components are mutually arranged to have the mixture located between the first and second joining surfaces. For some applications, pressure may be applied so that the mixture becomes at least to some extent deformed, such as spread out, whereas for other applications the mixture should keep the shape provided by the step of arranging the mixture.

In another alternative to the two methods just described, the above described object and several other objects are intended to be obtained by providing a method of manufacturing an object by joining a first component and a second component, the method comprising the following steps:
providing the first component comprising metal powder with a first alloy composition and a first soluble binder, the first component having a first joining surface,
providing the second component comprising metal powder with a second alloy composition and a second soluble binder, the second component having a second joining surface to be joined with the first joining surface;
wherein the first alloy composition and the second alloy composition both consist of a plurality of chemical elements, and wherein the chemical elements are chosen so that, for each of the chemical elements being present in an amount higher than 0.5 weight % in each of the alloy compositions, that chemical element is comprised both in the first and second alloy composition, and
for the chemical elements being present in the first alloy composition in amounts of up to 5.0 weight %, the amount of that chemical element differs by at most 1 percentage point between the first and second alloy compositions, and
for the chemical elements being present in the first alloy composition in amounts of more than 5.0 weight %, the amount of that chemical element differs by at most 3 percentage point between the first and second alloy compositions;

enabling the joining by:
with at least one of the first component and the second component being in a wet condition, bringing the first joining surface in contact with the second joining surface and maintaining this contact for a time period allowing for at least some evaporation of the solvent; and
sintering or oxidizing the first and second components together while maintaining the first and second joining surfaces in contact in order to achieve the object.

In embodiments of the invention according to the third of the three alternative methods described above, the step of joining can be done by performing the step shortly after the step of providing the components, e.g. by extrusion, or by making the components wet again. By a "wet condition" is meant that more than the surface is dissolved.

"Percentage points" is the unit for the arithmetic difference of two percentages. For example, moving up from 40% to 44% is a 4 percentage point increase, but it is a 10 percent increase in what is being measured.

The wording "allowing for at least some evaporation of the solvent" could also be referred to as drying. This step could include the application of heat and/or placement in an atmosphere comprising a lower amount of the solvent. The atmosphere could e.g. be air, such as air having a lower relative humidity than the surroundings. It may further include passing a flow of gas, such as air, along the components to be dried, and the speed of the flow of the gas may then also be controlled.

The sintering may e.g. be done in a reducing atmosphere, in vacuum, or in an inert atmosphere. The sintering is typically performed in a furnace at temperatures of 950 to 1430 degrees C.

Even though the above and the following description refers to first and second components, the method can also be used to join a higher number of components.

In alternatives to any of the above described embodiments, instead of comprising that "the first alloy composition and the second alloy composition both consist of a plurality of chemical elements", the methods could comprise the use of first and second components wherein the first alloy composition and/or the second alloy composition has only one chemical element. Such a composition could also be referred to as "metal composition" instead of "alloy composition". This means that in such alternative embodiments, the composition of the first and/or the second component may include only one chemical element, such as iron or copper. All other features and steps would be as described above.

The first and second components are preferably kept in mutual contact by application of some force in order to facilitate the joining. This force may be frictional, gravitational or externally applied. An externally applied force may e.g. be applied by use of jigs or fixtures. The application of an external force may be used to improve the quality and strength of the joining. For some embodiments, it may be relevant to apply a holding force that counteracts all or some of the gravitational force by holding at least one of the first and second components in the desired position. This may e.g. be relevant in embodiments including arranging a mixture between the first and second components, and wherein the weight of one of the components would be so large that it could influence, such as squeeze, the mixture in an undesired manner. The determination of which force to apply would typically be done by experimentation while visually checking that the contact is maintained without damaging the components or the mixture. The actual value to use for a given material and shape or size of the components may be determined either as force or pressure, i.e. force per area.

By the method as outlined above, it is possible to obtain an object in the form of a compound component with constant properties across the joint after sintering. It is therefore possible to manufacture larger and still uniform components without the need for processing equipment capable of manufacturing such large components that might otherwise require e.g. large tools and large pressures. It is also possible to manufacture such objects of several different sizes from one or a few sizes of first and second components. Hereby a more flexible and efficient manufacturing method is obtained which can easily be adapted to an actual need for a specific object for a given application. Furthermore, the method can be used for the manufacturing of objects that would not be possible to shape by conventional methods. Such an object could e.g. comprise internal cooling channels obtained by joining a first and a second component each forming half of the object and being shaped so that the internal channels are formed during the joining.

Another advantage of a method according to the invention is that it provides a coherent object without weak points, e.g. due to discontinuities, along the joint as often seen in known joining methods, such as welding and brazing.

In the method as described above, wherein a mixture is arranged between the first and second joining surfaces, the mixture may be arranged in a pre-determined pattern. Such a pattern could e.g. be determined to obtain an efficient drying, debinding and/or sintering of the material of the mixture. The predetermined pattern may be selected from straight lines, curved lines, circles, dots, and combinations thereof. Hereby it will be easier to ensure that the mixture is arranged in a pattern giving a large surface area for a given amount of material than what would be possible if the mixture covers all of the first and second joining surfaces. Another advantage of arranging the mixture in a predetermined pattern as described is that it may hereby be easier to ensure that the mixture remains between the first and second joining surfaces without being squeezed over the edge during the rest of the process steps.

Alternatively or in combination with these ways of arranging the mixture, the mixture may also be arranged as a plurality of layers at least in some regions. Hereby it will be possible to arrange the mixture in a way that results in the joined components being at a distance from each other, the distance being obtained and maintained via the mixture.

In any of the methods involving the arrangement of a mixture between the first and second joining surfaces, the step of arranging the mixture may be done by 3D-printing. Hereby the arrangement, such as in a predetermined pattern, can be controlled by use of a computer or other control unit so that it is easy to ensure that the mixture is arranged as intended and in a repeatable manner.

Another advantage of a method wherein the step of enabling the joining comprises arranging a mixture of dissolved binder and metal powder between the first joining surface and the second surface is that hereby the surfaces to be joined do not need to be even. In such a method, a step of at least partly dissolving the first joining surface and/or the second joining surface by applying a solvent may precede the step of arranging. Alternatively a step of providing at least one of the first component and the second component in a wet condition may precede the step of arranging. Hereby it can be obtained that voids are avoided, or at least that the amount thereof is reduced.

The first and second components may be manufactured by powder extrusion, powder injection moulding, additive manufacturing, or tape casting.

The alloy compositions of the first and second components may comprise one or more of the following: iron, chromium, aluminium, cobalt, nickel, manganese, molybdenum, vanadium, silicon or an alloy thereof. Examples of specific alloys which have been tested during the development of the present invention will be given in the detailed description of the figures.

In any of the embodiments as described above, the first and/or second components may comprise ceramic material, preferably as particles. Such ceramic material may e.g. be used to prepare an object having desired mechanical and electrical properties, such as resistivity and/or creep resistance, chosen for an intended use of the object. In such embodiments, the ceramics and the amounts thereof can be the same or different in the first and second components. Hereby the method provides for the manufacturing of an object having some different properties in two parts of the object while still being one coherent object with respect to other properties. In addition to varying the type and/or amount of ceramic material, the electrical and mechanical properties of the first and second components can also be varied by varying the size and/or the shape of the ceramic particles. A non-exhaustive list of possible ceramics include: AlO, SiO, ZiO, Alumina, Zirconia, Boron Nitride, Cordierite, and Silicon Nitride.

The sintering temperatures typically used in the present invention are so low that only the metal powder and not the ceramic powder will be sintered.

In embodiments as described above, wherein the step of enabling the joining is performed by arranging a mixture between the first and second joining surfaces, the mixture comprising dissolved third binder and metal powder may further comprise ceramic powder. The amount of ceramic powder may vary along the interface between the first and second joining surfaces. The adding of ceramic powder, possibly in varying amounts, makes it possible to control the local electrical properties of the object being formed by the joining, because of the significantly different electrical properties of metals and ceramics. This can be obtained by using a method wherein the amount of ceramic powder in the mixture can be varied during the step of arranging the mixture, so that the composition of the mixture can be varied across the first and second joining surfaces.

The sintering is typically performed in a reducing atmosphere, in vacuum, or in an inert atmosphere in order to reduce or prevent the formation of oxides.

A binder or a binding agent is any material or substance that holds or draws other materials together to form a cohesive unit mechanically, chemically, by adhesion or cohesion. The binder is preferably organic, such as cellulose ethers, agarose or polyoxymethylene. Examples of binders are: methylcellulose, 25 poly(ethylene oxide), poly(vinyl alcohol), sodium carboxymethylcellulose (cellulose gum), alginates, ethyl cellulose and pitch.

In presently preferred embodiments of the invention, the first binder and the second binder have similar or the same solvability, such as the first and second binders being the same. In embodiments wherein a mixture is arranged between the first and second joining surfaces, the third binder used in this mixture preferably has a similar or the same solvability as the first and second binders.

In some embodiments of the invention, the binders of the first and second components are dissoluble by water. This provides for a better work environment and handling than some other types of possible binders that need the use of e.g. acetone.

In some embodiments of the invention, each of the first and second components comprises a plurality of near-parallel or parallel channels extending throughout a longitudinal direction of the first and second components. For such embodiments, the first and second components may be arranged next to each other side by side so that the object has a number of channels which is a sum of a number of channels in the first component and a number of channels in the second component. Alternatively, the first and second components may be arranged so that the channels of the first and second components are in continuation of each other. In such embodiments, the cross-sectional geometries of the first and the second components perpendicular to the longitudinal direction may be so that the object has continuous channels extending from the first component and into the second component.

In presently preferred embodiments of the invention, after sintering or oxidizing former interfaces between the first component, the second component and, when present, the mixture cannot be identified or are close to inconspicuous by use of Scanning Electron Microscopy analysis.

In any of the embodiments described above, a step of debinding may precede the step of sintering or oxidizing. The debinding step preferably comprises heating the first and second components to a temperature at which at least some, such as all, of the binder burns off. Debinding is the process in which the binder is removed from the green body to ensure that no leftover carbon is present in the component during sintering or oxidizing. This debinding is typically done by heating to a temperature between 200 to 750 degrees Celsius and allowing the binder to burn off. Different binders require different debinding temperatures, so other temperatures may also be advantageous for some materials. In embodiments using methylcellulose, the debinding is done in an oxidizing atmosphere, typically air, but it can also be done partially in the same atmosphere as the sintering atmosphere, if the final component is not ruined by the extra content of carbon. In order to ensure that the debound first and second components can still be handled, it may be necessary to oxidize the powder slightly together; these oxides will be removed in the sintering process.

BRIEF DESCRIPTION OF THE FIGURES

The method of manufacturing according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
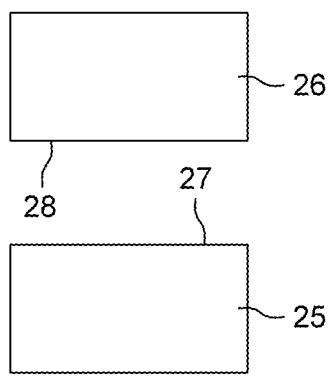
FIG. 1 shows schematically an embodiment of a method according to the present invention.
Figure 1:
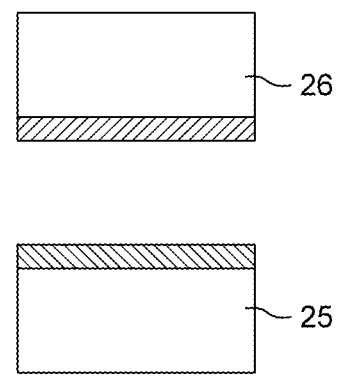
Figure 1:
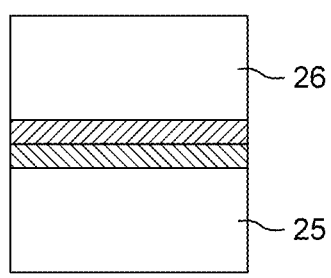
Figure 1:
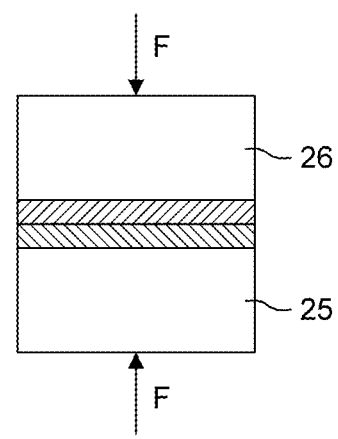
Figure 1:
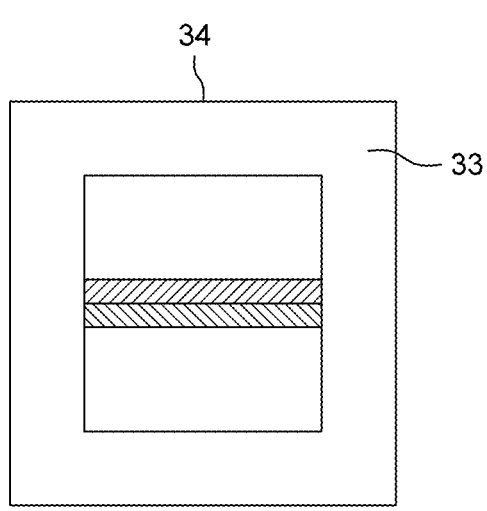
Figure 1:
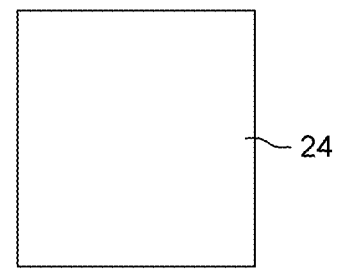

FIG. 1 shows schematically an example of how the present invention can be used to manufacture an object 24 by joining a first component 25 and a second component 26. FIG. 1.a shows the first and second components 25, 26 as being block-shaped, but the invention also covers many other geometries as long as they include two opposing surfaces adapted to be joined. The first component 25 comprises metal powder with a first alloy composition and a first soluble binder. The first component 25 has a first joining surface 27 which in FIG. 1.a is an upper surface. The second component 26 comprises metal powder with a second alloy composition and a second soluble binder. The second component 26 has a second joining surface 28 to be joined with the first joining surface 27. In FIG. 1.a, the first joining surface 27 is a lower surface of the interface to be established, but the arrangement of the first and second joining surfaces could be different from the illustrated ones. They could e.g. be horizontally oriented.

As also explained above, the first alloy composition and the second alloy composition both consist of a plurality of chemical elements. The chemical elements are chosen so that, for each of the chemical elements being present in an amount higher than 0.5 weight % in each of the alloy compositions, that chemical element is comprised both in the first and second alloy composition, for the chemical elements being present in the first alloy composition in amounts of up to 5.0 weight %, the amount of that chemical element differs by at most 1 percentage point between the first and second alloy compositions, and for the chemical elements being present in the first alloy composition in amounts of more than 5.0 weight %, the amount of that chemical element differs by at most 3 percentage point between the first and second alloy compositions.

In the embodiment shown in FIG. 1.b, the joining is typically enabled by dissolving both the first joining surface 27 and the second joining surface 28 by applying a solvent (not shown). However, it may also be possible to dissolve just one of the first and second joining surfaces 27, 28 or to dissolve only part of one or both of the first and second joining surfaces 27, 28. In embodiments of the invention, wherein the step of joining includes providing at least one of the first component 25 and the second component 26 in a wet condition, this would resemble what is shown in FIG. 1 except that a larger part, such as all, of at least one of the first and second components 25, 26 would be in a wet condition, i.e. shown as hatched in the figure.

The first joining surface 27 is then brought in contact with the second joining surface 28 as shown in FIG. 1.c. The first and second joining surfaces 27, 28 are maintained in contact for a time period allowing for at least some evaporation of the solvent. This may be done while applying an external force F as shown schematically in FIG. 1.d.

The first and second components 25, 26 are then sintered together while maintaining the first and second joining surfaces 27, 28 in contact in order to achieve the object 24. In the embodiment shown in FIG. 1.e, this sintering is performed in a reducing atmosphere 33, e.g. inside a furnace 34, but it could also be in vacuum or in an inert atmosphere. The sintering is typically performed at temperatures of 950 to 1430 degrees C. FIG. 1.f schematically shows the final object 24 as one unit.

Figure 2:
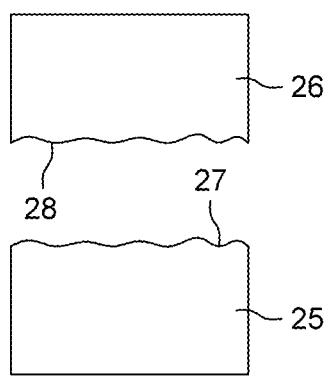
FIG. 2 shows schematically another embodiment of a method according to the present invention.
Figure 2:
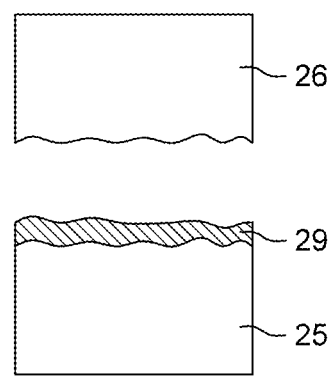
Figure 2:
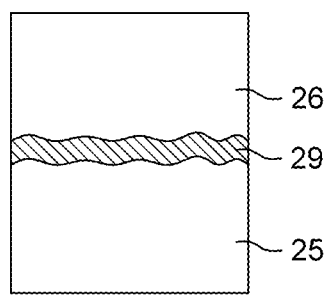
Figure 2:
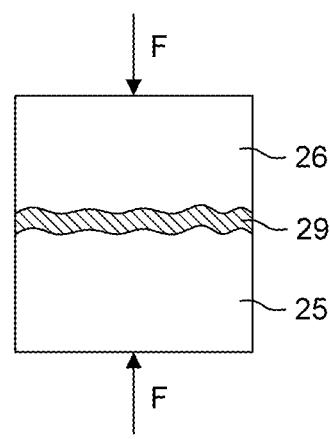
Figure 2:
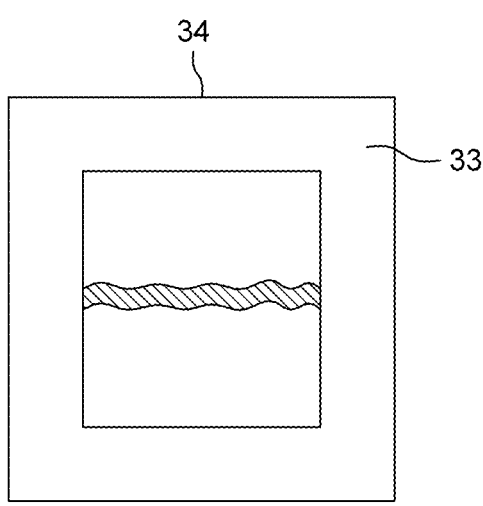
Figure 2:
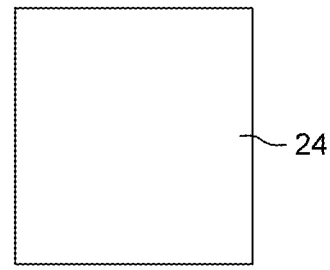

FIG. 2 shows schematically an alternative embodiment resembling the one in FIG. 1. This method can be used to manufacture an object 24 by joining a first component 25 and a second component 26 having uneven first and second joining surfaces 27, 28, respectively, as shown in FIG. 2.a. In the figures, the first and second joining surfaces 27, 28 are shown with similar contours, but the contours could also be different. A mixture 29 of dissolved third binder and metal powder with a third alloy composition is arranged between the first joining surface 27 and the second joining surface 28; this is shown in FIG. 2.b. The third alloy composition consists of a plurality of chemical elements which are chosen so that, for each of the chemical elements being present in an amount higher than 0.5 weight % of the metal powder in the mixture: for the chemical elements being present in the third alloy composition in amounts of up to 5.0 weight %, the amount of that chemical element differs by at most 1 percentage point between the first and third alloy compositions, and for the chemical elements being present in the third alloy composition in amounts of more than 5.0 weight %, the amount of that chemical element differs by at most 3 percentage point between the first and third alloy compositions. If found necessary, it is possible to dissolve the first joining surface 27 and/or the second joining surface 28 by applying a solvent (not shown) before the mixture 29 of dissolved third binder and metal powder is arranged.

Then, as shown in FIG. 2.c, the first and second joining surfaces 27, 28 are arranged as close together as possible while sandwiching the mixture 29 of dissolved third binder and metal powder there between and maintaining the first and second joining surfaces 27, 28 in contact with the mixture 29 of dissolved third binder and metal powder for a time period allowing for at least some evaporation of the solvent. As shown in FIG. 2.d, this step may involve the application of an external force F.

In the same way as described above, the first and second components 25, 26 are then sintered together while maintaining the first and second joining surfaces 27, 28 as close together as possible in order to achieve the object. In the embodiment shown in FIG. 2.e this sintering is performed in a reducing atmosphere 33, e.g. inside a furnace 34. The manufactured object 24 is shown in FIG. 2.f.

Figure 3:
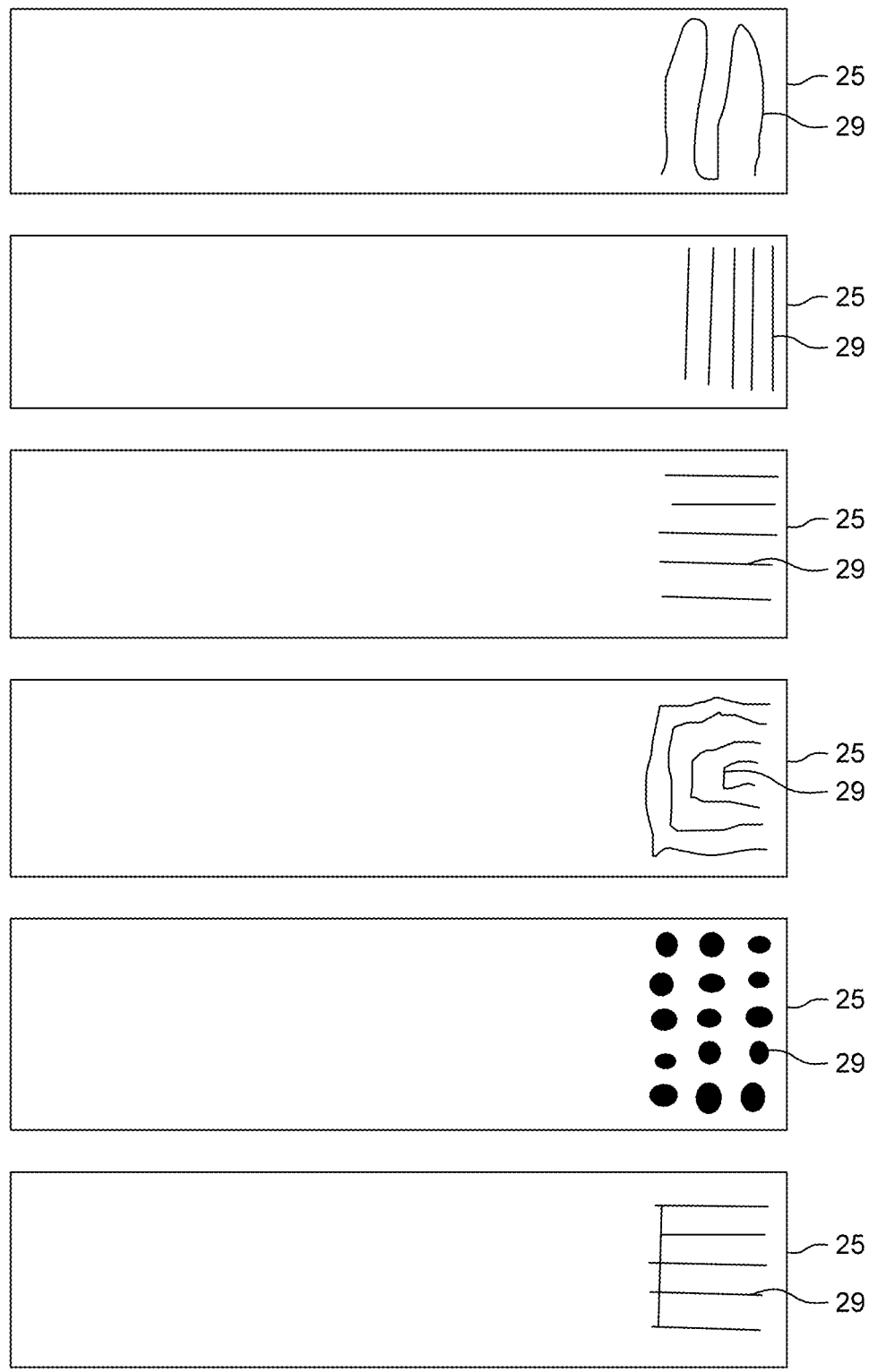
FIG. 3 shows schematically different examples of how the mixture can be arranged in a different pre-determined pattern.

In the embodiment in FIG. 2, the mixture 29 is shown as being arranged over the whole of the first joining surface 27. However, as described above, for some applications, it will be advantageous to arrange the mixture 29 in a pre-determined pattern, e.g. by use of a 3D-printer. Different examples of such patterns are shown schematically in FIG. 3 showing top views of the mixture 29 arranged in one end of a first component 25. As seen, the mixture 29 may e.g. be in the form of straight lines, curved lines, circles, dots, or combinations thereof. Depending on the method used for the arrangement of the mixture, the lines may not be completely straight, the sizes of the dots may not be completely the same, and the lines may not meet exactly as intended.

Figure 4A:
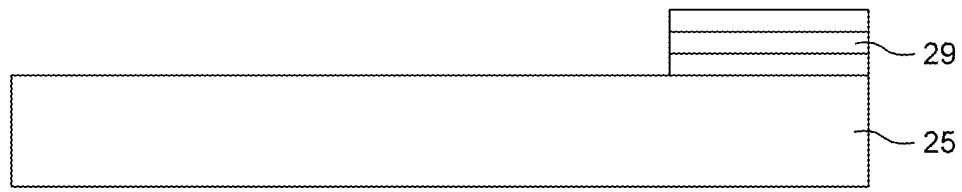
FIG. 4 shows schematically an embodiment, wherein the mixture is arranged as a plurality of layers in some regions.
Figure 4B:
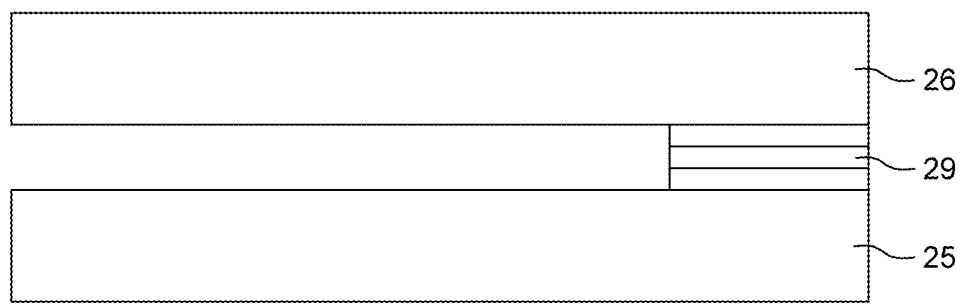
Figure 5A:
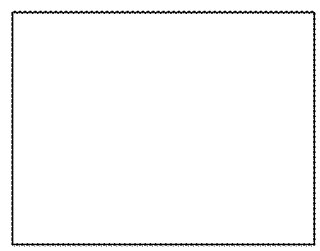
FIGS. 5.a-5.c show schematically different examples of first and second components that can be joined by a method according to the present invention.
Figure 5A:
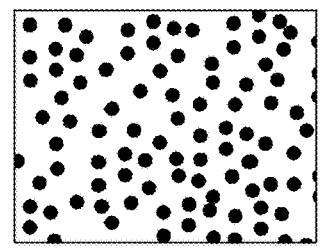
Figure 5B:
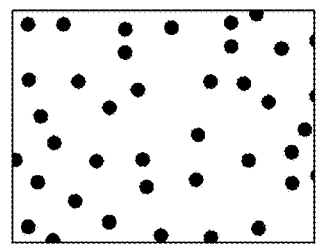
Figure 5B:
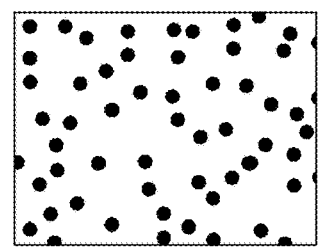
Figure 5C:
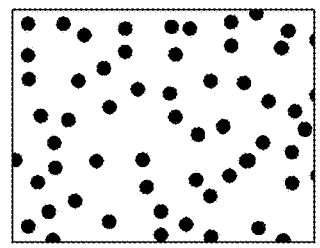
Figure 5C:
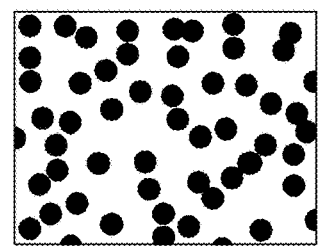

FIG. 4.a shows a side view of an embodiment, wherein the mixture 29 is arranged as a plurality of layers. This can e.g. be used to take into account the mutual shapes of the first and second joining surfaces 27,28 or just to ensure that more mixture 29 is arranged at some regions than others. The application of the mixture 29 as a plurality of layers may also be used to build up a relatively thick joining region, such as to obtain a specific distance between the non-touching regions of the first and second components 25, 26 after joining. FIG. 4.a is an example of such an object with three layers of mixture 29. FIG. 4.b shows the object having a first component 25 and a second component 26 joined via the mixture 29.

In any of the methods shown in FIGS. 1-4, the first and second components 25, 26 may be manufactured by powder extrusion, powder injection moulding, additive manufacturing, or tape casting.

In relation to the embodiments of the invention including the use of a mixture being arranged between the first and second joining surfaces 27,28, some examples of potential problems in case the third alloy composition of the mixture is too different from the first alloy composition can be given. As a first example, FeCrAl can be used for heating elements but if a mixture having a metal powder with too little Al is used, then there would be no protection by the formation of AlO on the surface of this bonding region, and it would therefore not be able to withstand as much heat as the regions of the components being joined. Therefore, a failure could happen in this bonding region during use of the object. As a second example, the same could be said about corrosion resistance of 316L. If the amount of Cr in the third alloy composition of the mixture is too small, then it will not have the same corrosion resistance in the bonding region thereby causing an undesired weak region.

The material compositions of the first and second components 25, 26 may be the same, but it may also differ. FIG. 5 shows schematically examples of different combinations of cross-sections for components comprising ceramic particles. In FIG. 5 the ceramic particles are shown as black even though they are white in the real components. FIG. 5.a shows an example where the first component is without ceramic, and the second component is with ceramic. FIG. 5.b shows another example where both the first and second components comprise ceramic particles but in different volume fractions. FIG. 5.c shows a third example where the size of the ceramic particles is different in the first and the second components.

Figure 6:
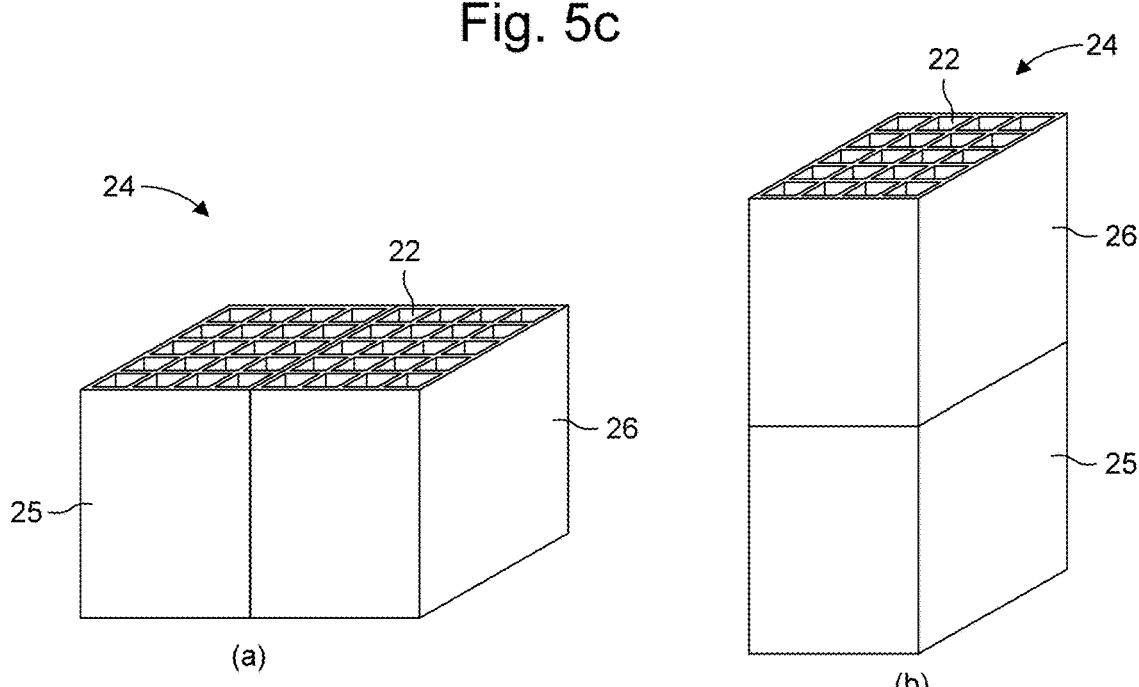
FIG. 6 shows schematically two different ways of mutually arranging first and second components to form an object.

Depending on the desired final shape or size, an object 24 can be manufactured by joining first and second components 25, 26 with a method according to the present invention. FIG. 6.a shows an embodiment wherein first and second components 25, 26 in the form of block-shaped elements comprising longitudinally extending channels 22 are arranged next to each other side by side so that the object 24 has a number of channels 22 which is a sum of a number of channels 22 in the first component 25 and a number of channels 22 in the second component 26. FIG. 6.b shows another embodiment wherein the first and second components 25, 26 are arranged so that the channels 22 of the first and second components 25, 26 are in continuation of each other. The present invention can also be used to join a component having channels with a component without channels, such as a solid component.

Figure 7A:
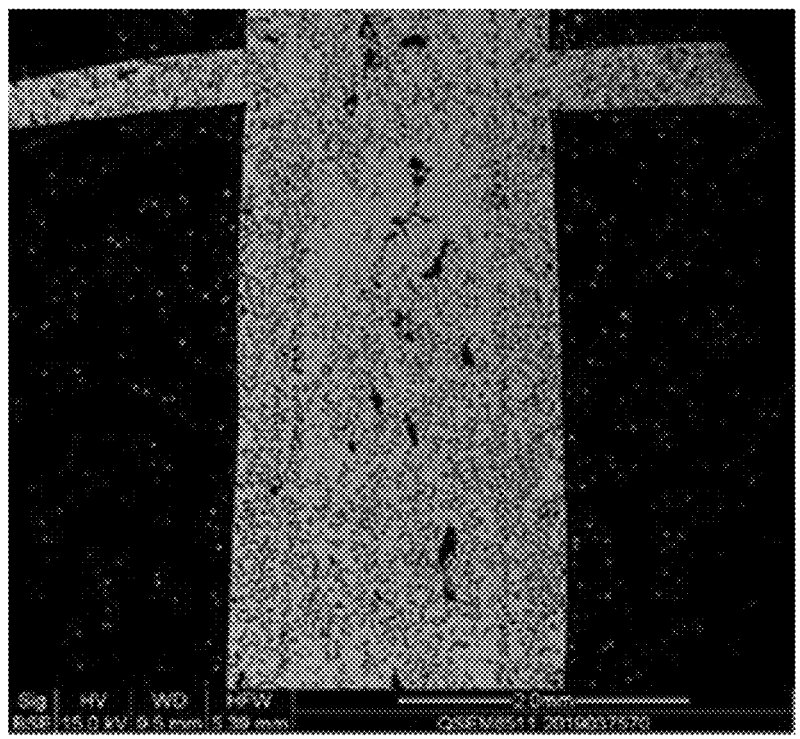
FIGS. 7.a and 7.b show microscope images of objects that have been made by joining a first and a second component.
Figure 7B:
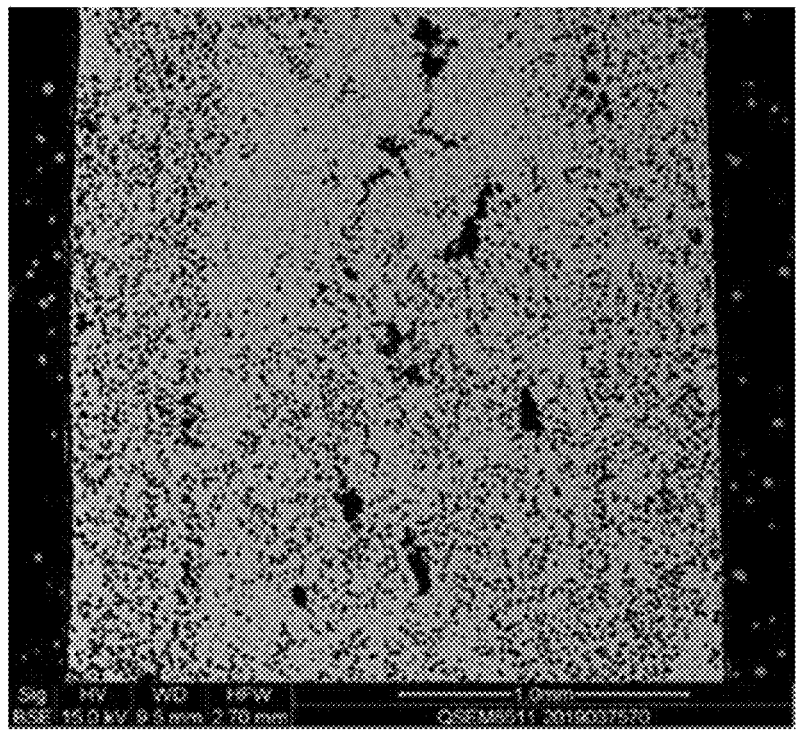

During the development of the present invention, components made from FeCrAl and 316L have been joined and sintered. The binder was methylcellulose and water. By use of Scanning Electron Microscopy (SEM) it was proven that the transitions between the material phases from the joined components were close to invisible. FIG. 7 shows two microscope images at different magnifications of objects that have been obtained by joining three components. The components were prepared from the same metal powder material of FeCrAl. Analysing the joining region with SEM and energy-dispersive X-ray spectroscopy shows that there is no apparent separation or interface between the connected components in the SEM pictures. The only difference between the three components is a slightly higher porosity in the outer components compared to the middle one, whereas any minor variation in the material composition across the cross-section is indistinguishable. The object in FIG. 7 has channels; they are the large dark regions in the images.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Method of manufacturing an object by joining a first component and a second component, the method comprising the following steps:
   providing the first component comprising metal powder with a first alloy composition and a first soluble binder, the first component having a first joining surface,
   providing the second component comprising metal powder with a second alloy composition and a second soluble binder, the second component having a second joining surface to be joined with the first joining surface;
wherein the first alloy composition and the second alloy composition both consist of a plurality of chemical elements, and wherein the chemical elements are chosen so that, for each of the chemical elements being present in an amount higher than 0.5 weight % in each of the alloy compositions, that chemical element is comprised both in the first and second alloy composition, and
   for the chemical elements being present in the first alloy composition in amounts of up to 5.0 weight %, the amount of that chemical element differs by at most 1 percentage point between the first and second alloy compositions, and
   for the chemical elements being present in the first alloy composition in amounts of more than 5.0 weight %, the amount of that chemical element differs by at most 3 percentage point between the first and second alloy compositions;
enabling the joining by:
   arranging a mixture comprising dissolved third binder and metal powder with a third alloy composition between the first joining surface and the second surface, such as on at least one of the first and second joining surfaces, wherein the third alloy composition consists of a plurality of chemical elements which are chosen so that, for each of the chemical elements being present in an amount higher than 0.5 weight % of the metal powder in the mixture:
      for the chemical elements being present in the third alloy composition in amounts of up to 5.0 weight %, the amount of that chemical element differs by at most 1 percentage point between the first and third alloy compositions, and
      for the chemical elements being present in the third alloy composition in amounts of more than 5.0 weight %, the amount of that chemical element differs by at most 3 percentage point between the first and third alloy compositions, and
   arranging the first and second joining surfaces as close together as possible while sandwiching the mixture of dissolved third binder and metal powder there between, and maintaining the first and second joining surfaces in contact with the mixture of dissolved third binder and metal powder for a time period allowing for at least some evaporation of the solvent; and
sintering or oxidizing the first and second components together while maintaining the first and second joining surfaces as close together as possible in order to achieve the object.

2. Method according to claim 1, wherein the mixture is arranged in a pre-determined pattern.

3. Method according to claim 2, wherein the predetermined pattern is selected from straight lines, curved lines, circles, dots, and combinations thereof.

4. Method according to claim 1, wherein the mixture is arranged as a plurality of layers at least in some regions.

5. Method according to claim 1, wherein the step of arranging the mixture performed by 3D-printing.

6. Method according to claim 1, wherein one of the following steps precedes at least one of the steps of arranging a mixture and arranging the first and second joining surfaces:
   at least partly dissolving the first joining surface and/or the second joining surface by applying a solvent, or
   providing at least one of the first component and the second component in a wet condition.

7. Method according to claim 1, wherein the first and/or second components comprises ceramic material.

8. Method according to claim 1, wherein the mixture comprising dissolved third binder and metal powder further comprises ceramic powder.

9. Method according to claim 8, wherein the amount of ceramic powder in the mixture can be varied during the step of arranging the mixture, so that the composition of the mixture can be varied across the first and second joining surfaces.

10. Method according to claim 1, wherein the first binder, the second binder, and, if present, the third binder have similar or the same solvability, such as the first, second, and third binders being the same.

11. Method according to claim 1, wherein each of the first and second components comprises a plurality of near-parallel or parallel channels extending throughout a longitudinal direction of the first and second components.

12. Method according to claim 1, wherein after sintering or oxidizing former, interfaces between the first component, the second component and, when present, the mixture cannot be identified or are close to inconspicuous by use of Scanning Electron Microscopy analysis.

* * * * *